US009205548B2

(12) United States Patent
Aoki

(10) Patent No.: US 9,205,548 B2
(45) Date of Patent: Dec. 8, 2015

(54) IMPACTING TOOL

(75) Inventor: Yonosuke Aoki, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 589 days.

(21) Appl. No.: 13/490,924

(22) Filed: Jun. 7, 2012

(65) Prior Publication Data

US 2012/0315103 A1 Dec. 13, 2012

(30) Foreign Application Priority Data

Jun. 10, 2011 (JP) ................................. 2011-130244

(51) Int. Cl.
*B23B 31/10* (2006.01)
*B25D 17/08* (2006.01)

(52) U.S. Cl.
CPC ...... *B25D 17/088* (2013.01); *B25D 2217/0069* (2013.01); *Y10T 408/95* (2015.01)

(58) Field of Classification Search
CPC ....... B25B 17/00; B25B 17/02; B25D 17/088
See application file for complete search history.

(56) References Cited

U.S. PATENT DOCUMENTS

| | | | |
|---|---|---|---|
| 4,491,444 A | 1/1985 | Rumpp et al. | |
| 5,373,905 A * | 12/1994 | Bleicher et al. | 173/109 |
| 5,601,388 A | 2/1997 | Lauterwald | |
| 5,842,527 A * | 12/1998 | Arakawa et al. | 173/48 |
| 2003/0137114 A1 | 7/2003 | Baumann et al. | |
| 2007/0209814 A1* | 9/2007 | Furusawa et al. | 173/48 |
| 2011/0073338 A1* | 3/2011 | Ikuta | 173/162.2 |

FOREIGN PATENT DOCUMENTS

| | | |
|---|---|---|
| DE | 3828309 A1 | 2/1990 |
| JP | S584374 A | 1/1983 |
| JP | A-02-88185 | 3/1990 |
| JP | A-07-251384 | 10/1995 |
| JP | A-08-281572 | 10/1996 |
| JP | A-2004-508213 | 3/2004 |
| JP | A-2007-237354 | 9/2007 |

OTHER PUBLICATIONS

Aug. 2, 2013 Extended European Search Report issued in European Application No. 12171306.9.

Sep. 19, 2014 Office Action issued in Japanese Patent Application No. 2011-130244 (with translation).

Feb. 17, 2015 Office Action issued in Japanese Application No. 2011-130244.

* cited by examiner

*Primary Examiner* — Hemant M Desai
*Assistant Examiner* — Mary Hibbert
(74) *Attorney, Agent, or Firm* — Oliff PLC

(57) ABSTRACT

The impacting tool has a tool holder and a locking part. The locking part can be driven to move between the bit holding position, where it is engaged with the tool bit inserted into the bit inserting hole so that pullout is restrained, and a bit holding released position where the engagement is released and pullout is allowed. The locking part and the tool holder can be integrated with each other while moving in the longitudinal direction of the tool bit, so that they can be driven to move between the bit anchored position where the locking part is set at the bit holding position and the engagement state with respect to the tool bit is maintained, and the bit last connection/disconnection allowed position where the locking part is set at the bit holding released position and releasing of the engagement with respect to the hammer bit is allowed.

12 Claims, 9 Drawing Sheets

IMPACTING TOOL

TECHNICAL FIELD

The present invention relates to an impacting tool that has a tool bit performing an impact operation in the longitudinal direction to carry out the prescribed processing operation on the workpiece.

BACKGROUND ART

Japanese non-examined laid-open publication JP2004-508213 discloses a bit holder in an impacting tool, wherein a steel ball is provided for holding the tool bit which is inserted in a bit inserting hole of the tool holder. As to the known bit holder, a long hole that goes through the radial direction in the tool holder is arranged for a prescribed length in the longitudinal direction and, in the aforementioned long hole, the steel ball is arranged so that it can move in the longitudinal direction and radial direction of the tool holder. As the tool bit is inserted into the bit inserting hole, the steel ball is pressed by the tip of the tool bit, so that it goes against the energizing force of a compressive coil spring to push a holding sleeve back to the depth side (the tool's main body side) in the longitudinal direction. It then moves outward in the radial direction so that it allows further insertion of the tool bit. As the tool bit is inserted to the prescribed position, the steel ball moves inward in the radial direction and is locked in a slot of the tool bit. In this locked state, the state is kept by a lock ring arranged appropriately to ensure that it covers the steel ball from the outer side in the radial direction. The lock ring can move freely in the longitudinal direction together with an operation sleeve that allows manual manipulation and, as the lock ring is moved from the position where it covers the steel ball to a recessed position, locking of the steel ball with respect to the slot on the tool bit is released, so that the tool bit can be pulled out from the bit inserting hole.

For an impacting tool that carries out a hammering operation or hammer drilling operation or other processing operation by the tool bit on concrete or other workpiece, dust is generated in the processing operation. Consequently, the bit holder arranged in the tip region of the impacting tool is always exposed to the dust. Consequently, it is necessary to adopt measures against dust to prevent dust from invading into the interior of the bit holder. However, for the conventional bit holder, there is still room for improvement with respect to the dust-proof measures.

REFERENCES OF PRIOR ART

Patent References

[Patent Reference 1] JP-T-2004-508213

SUMMARY OF THE INVENTION

Accordingly, it is an object of the invention to improve dust-proof performance for an impacting tool.

The object as described above can be achieved by a claimed invention. According to the invention, a representative impacting tool is provided to comprise a tool-bit to carry out an operation with linear movement in the longitudinal direction to perform the prescribed processing operation on the workpiece. The representative impacting tool has a tool holder having a bit inserting hole that allows the tool bit to be inserted in it and a locking part that holds the tool bit inserted into the bit inserting hole so that it cannot be pulled out from the bit inserting hole; the locking part is attached so that it can undergo relative movement with respect to the tool holder in a direction perpendicular to the longitudinal direction of the tool bit. It has a constitution that allows it to move between the bit holding position, where it is engaged with the tool bit inserted in the bit inserting hole to restrain pulling of the tool bit from the bit inserting hole, and a bit holding released position where the lock is released and the tool bit can be pulled out from the bit inserting hole. In addition, the locking part and the tool holder can be integrated with each other while moving in the longitudinal direction of the tool bit; they have a constitution that allows them to be driven to move between the bit anchored position, where the locking part is set at the bit holding position to keep the locked state with respect to the tool bit, and the bit connection/disconnection allowed position where the locking part is set at the bit holding released position so that the lock can be released with respect to the tool bit.

According to a preferable embodiment of the present invention, the following constitutions are adopted: a constitution in which the locking part can be driven to move between the bit holding position and the bit holding released position in a direction perpendicular to the longitudinal direction of the tool bit with respect to the tool holder, as well as a constitution in which the locking part and the tool holder can be driven to move between the bit anchored position in the longitudinal direction of the tool bit and the bit connection/disconnection allowed position in the longitudinal direction of the tool bit, so that the tool holder and the locking part can be attached and removed. According to the present invention, it is possible to adopt a constitution in which the tool holder and the locking part are covered from their outer side, so that the dust-proof measures can be easily realized.

According to the impacting tool of the present invention, there are also the following parts: an impact bolt for applying the impact force in the longitudinal direction on the tool bit, and an impact bolt holder that accommodates the impact bolt so that the impact bolt can make linear movement. The tool holder is formed as a part separated from the impact bolt holder and, at the same time, it can undergo relative movement in the longitudinal direction with respect to the impact bolt holder. On the tool holder, a hook for transferring the rotating force of the tool holder to the tool bit is formed and, on the tool bit, a first slot where the hook is engaged and a second slot where the locking part is engaged are formed, respectively.

The tool holder having the hook for transferring the rotating force to the tool bit can be exchanged when the hook is worn off. Depending on the specific embodiment, the tool holder for holding the tool bit is formed as a part separated from the impact bolt holder that accommodates the impact bolt, so that the size can be reduced to the minimum necessary dimension needed for holding the tool bit. As a result, exchange of the tool holder in case of a worn hook can be carried out at a relatively low cost, so that the burden related to cost on the user can be cut. In addition, because the tool holder is formed in a smaller size, it is possible to carry out manufacture using a wear resistant material or intensity management related to a wear resistant treatment, etc., at a relatively low cost.

According to another embodiment of the impacting tool of the present invention, there is a base portion covering the outer peripheral side of the tool holder, an accommodating space for accommodating the locking part is formed on the inner wall of the base portion. When the tool holder and the locking part are located at the bit connection/disconnection allowed position, the accommodating space allows accommodation of the locking part and moving of the locking part to the bit holding released position.

According to this embodiment, while the outer peripheral side of the tool holder is covered by the base portion, an accommodating space that allows movement of the locking part to the bit holding released position is formed on the inner wall of the base portion so that invasion of the dust from outside the base portion into the interior can be suppressed, so the dust-proof effect can be improved.

According to another embodiment of the impacting tool of the present invention, the tool bit is inserted into the bit inserting hole of the tool holder and the locking part is pressed by the tool bit. In this case, the locking part and the tool holder are integrated with each other as they move in the longitudinal direction of the tool bit from the bit anchored position to the bit connection/disconnection allowed position. After the locking part has been driven to move to the bit connection/disconnection allowed position, as the tool bit is further inserted into the bit inserting hole, the locking part is pressed by the tool bit so that it is driven to move to the bit holding released position. After movement to the bit holding released position, as the tool bit is further inserted into the bit inserting hole, the locking part is driven to move from the bit holding released position to the bit holding position, so that the tool bit is locked to the tool bit or becomes the lockable state. In this lockable state, as the tool holder and the locking part are driven to move from the bit connection/disconnection allowed position to the bit anchored position, the locking part is locked to the tool bit and the tool bit is held on the tool holder.

According to another embodiment of the impacting tool of the present invention, there is a manually operated part that can be operated to move the tool holder and the locking part integrated with each other. When the manual operating part is operated to move the tool holder and the locking part integrated with each other from the bit anchored position to the bit connection/disconnection allowed position, it is possible to remove the tool bit from the tool holder.

According to another embodiment of the impacting tool of the present invention, there is an energizing part that energizes the tool holder and the locking part so that they are driven to move from the bit connection/disconnection allowed position to the bit anchored position while they are integrated with each other. This energizing part is arranged so that the manual operating part is energized.

According to this embodiment, by means of the constitution in which the energizing part energizes the manual operating part, it is easier to guarantee the space for arranging the energizing part than the case in which the tool holder is energized.

According to another embodiment of the impacting tool of the present invention, there is a base portion that covers the outer peripheral side of the tool holder. On this base portion, an opening perpendicular to the longitudinal direction of the tool bit is formed. The manual operating part is arranged on the outer side of the base portion and, at the same time, it is connected with the tool holder through the opening portion. In addition, the manual operating part has a dustproof cover that blocks the opening portion in contact with the outer surface of the base portion in a relatively slidable way.

In this embodiment, because the opening portion of the base portion is always blocked by the dustproof cover, it is possible to prevent the dust from invading the tool holder side.

According to another embodiment of the present invention, an impact bolt holder is formed as a part separated from the base portion, and it is attached on the base portion so that it can be removed from the base portion.

In this embodiment, when the impact bolt holder is worn off, it is possible to exchange the impact bolt holder unit with a new one. Consequently, it is possible to make exchange at a lower cost, so that it is possible to decrease the burden of cost on the user.

According to another embodiment of the impacting tool of the present invention, on the tip of the base portion, a tip sleeve is attached in contact with the outer peripheral surface of the tool bit so that it can be removed at will.

In this embodiment, by means of the tip sleeve in contact with the outer peripheral surface of the tool bit, it is possible to prevent the dust from invading through the gap between the outer peripheral surface of the tool bit and the inner peripheral surface of the bit inserting hole. At the same time, when the tip sleeve is worn off, the tip sleeve can be removed from the base portion to be exchanged with a new one.

According to another embodiment of the impacting tool of the present invention, the tool holder is inserted from the tip of the base portion into the base portion and, after the insertion, it is locked by the tip sleeve attached on the base portion. When the tip sleeve has been removed from the base portion, it can be pulled out from the base portion.

According to this embodiment, it is possible to use the tip sleeve to control connection/disconnection of the tool holder with respect to the base portion.

According to the present invention, an improved impacting tool with a better dustproof effect is provided. Other objects, features and advantages of the present invention will be readily understood after reading the following detailed description together with the accompanying drawings and the claims.

REPRESENTATIVE EMBODIMENT OF THE INVENTION

Each of the additional features and method steps disclosed above and below may be utilized separately or in conjunction with other features and method steps to provide and manufacture improved impacting tools and method for using such impacting tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
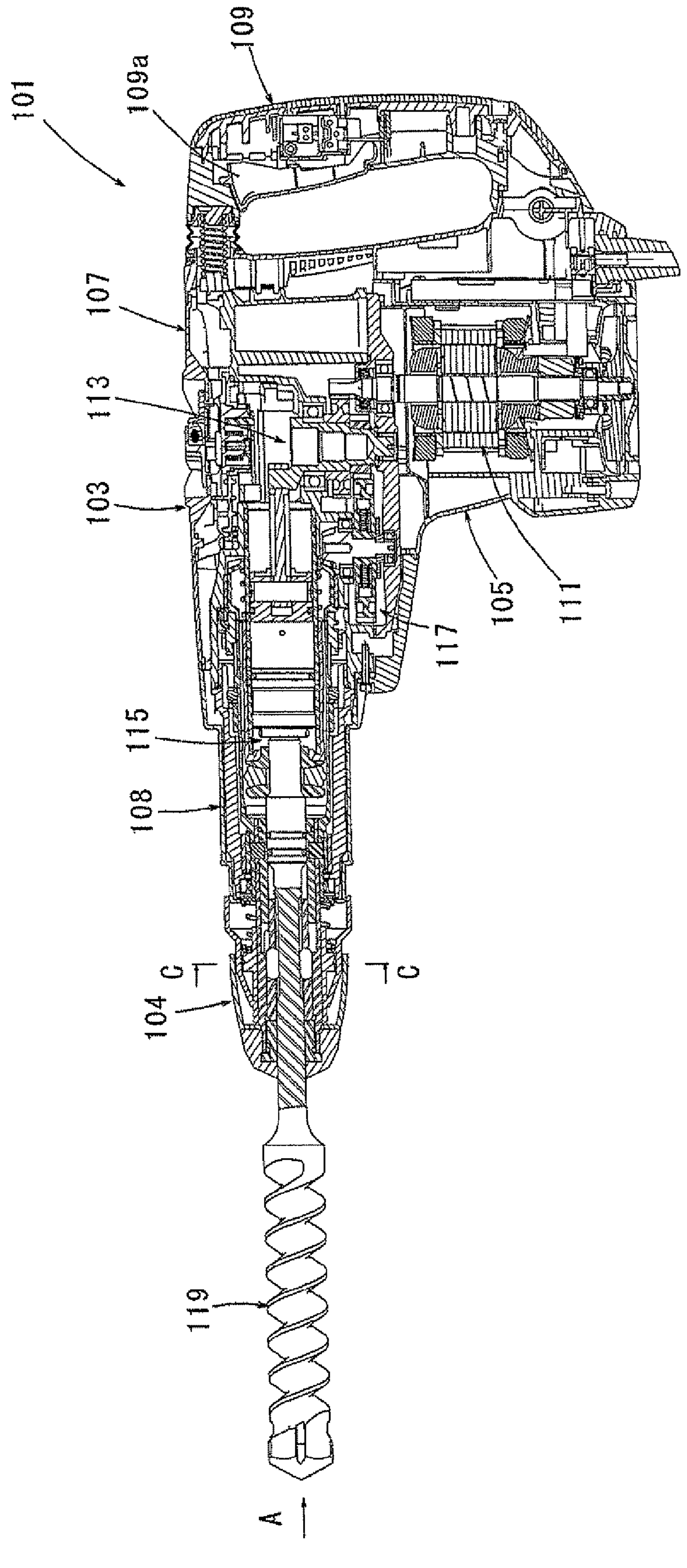
FIG. 1 is a cross-sectional view illustrating the overall constitution of the hammer drill in an embodiment of the present invention.

In the following description, the embodiment of the present invention will be explained with reference to FIG. 1 through FIG. 12. In this embodiment, an explanation will be made on an electric hammer drill as an example of the impacting tool. As shown in FIG. 1, generally speaking, the electric hammer drill 101 of this embodiment comprises a main body 103 as the main body of the tool formed as the outer portion of the hammer drill 101, a chuck 104 as a tool holding device equipped in the tip of the main body 103 (the left hand side shown in FIG. 1), and a handgrip 109 held by the operator in carrying out the processing operation and attached on the rear end portion of the main body 103 (the right hand side shown in FIG. 1). On the chuck 104, a hammer bit 119 is installed so that it can undergo relative movement in the longitudinal direction, and it can monolithically rotate in the circumferential direction. Here, the hammer bit 119 corresponds to the "tool bit" of the present invention. In order to facilitate explanation, the side of the hammer bit 119 is taken as the front side, and the side of the handgrip 109 is taken as the rear side.

The main body 103 mainly comprises a motor housing 105 that accommodates a driving motor 111, a movement transforming mechanism 113, an impacting element 115 and a gear housing 107 that accommodates the power transmission mechanism 117. On the front region (tip side) of the gear housing 107, a cylindrical shaped barrel portion 108 extending in the longitudinal direction is formed. This barrel portion 108 is jointed in a quick connected/disconnected way at multiple sites in the circumferential direction by screws on the front end surface of the gear housing 107. The rotating output of the driving motor 111 is appropriately transformed by the movement transforming mechanism 113 to a linear movement that is transferred to the impacting element 115, so that an impact force is generated in the longitudinal direction (the left/right direction shown in FIG. 1) of the hammer bit 119 via the impacting element 115. In addition, the rotating output of the driving motor 111 is subject to appropriate reduction by the power transmission mechanism 117 and is then transferred to the hammer bit 119, so that the hammer bit 119 rotates in the circumferential direction. Here, the driving motor 111 is turned on by electric power as the trigger 109*a* arranged on the handgrip 109 is pulled.

Figure 2:
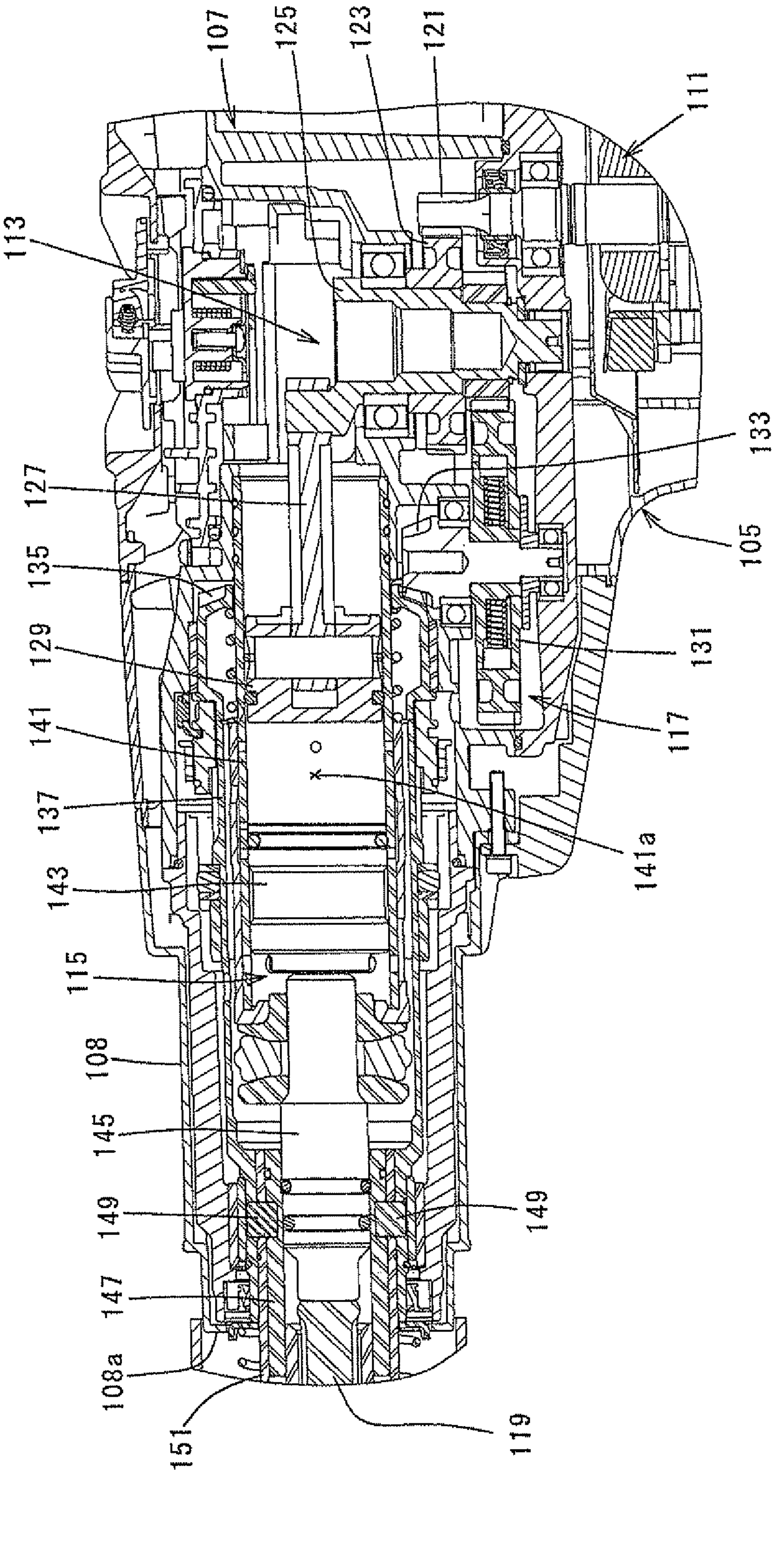
FIG. 2 is an enlarged cross-sectional view illustrating the main portion of the hammer drill.
Figure 3:
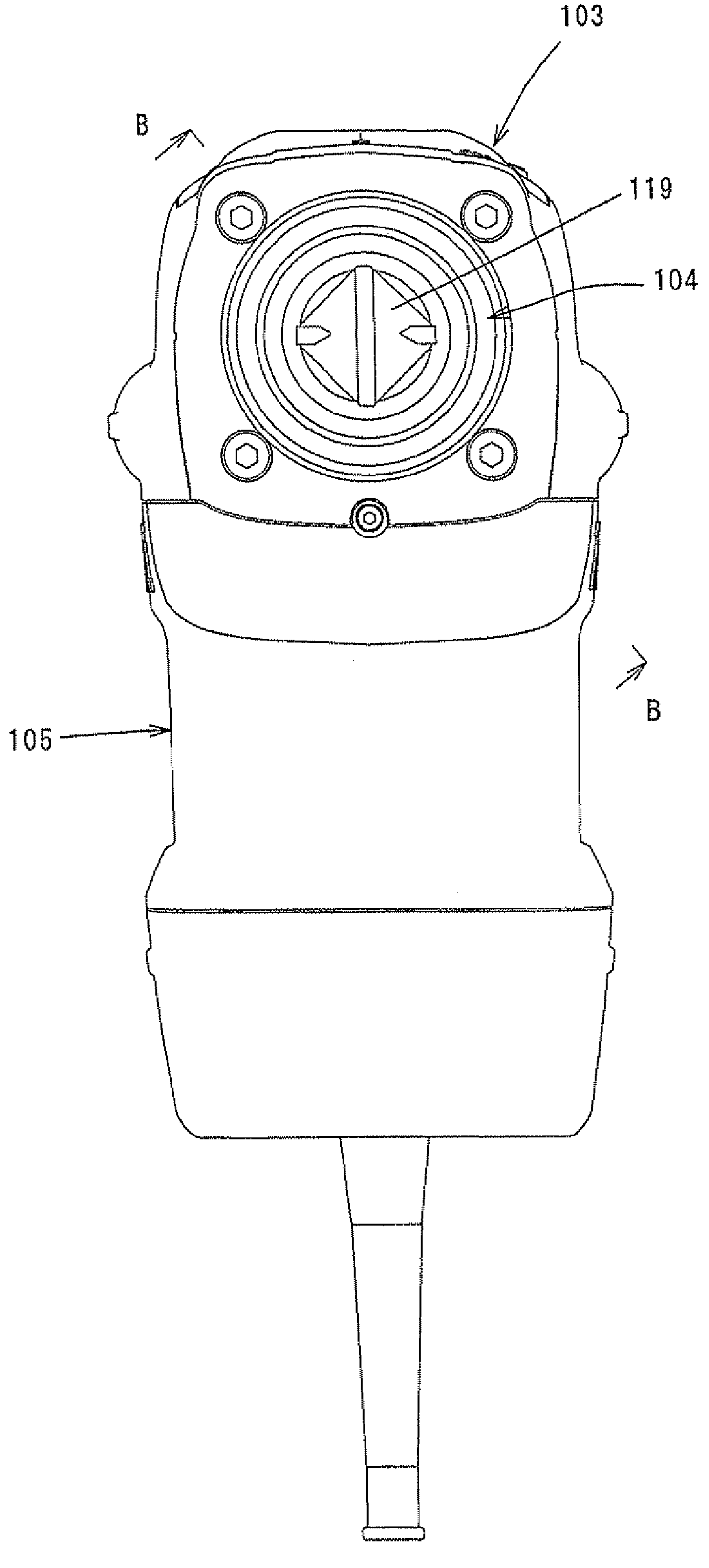
FIG. 3 is a view in direction A in FIG. 1.

As far as the movement transforming mechanism 113, impacting element 115 and power transmission mechanism 117 are concerned, because they are well known, they will be explained only briefly. As shown in FIG. 2. the movement transforming mechanism 113 mainly comprises driving gear 121 driven to rotate in the horizontal plane by a driving motor 111, slave gear 123 engaged with the driving gear 121, crankshaft 125 rotated together with the slave gear 123, connecting rod 127 that transforms the rotating movement of the crankshaft 125 to the linear movement and transfers the linear movement to the piston 129, and the piston 129, which is arranged in a freely sliding way in the cylinder 141 and works as the driving part undergoing linear movement in the longitudinal direction of the hammer bit 119. Here, the crankshaft 125, connecting rod 127 and piston 129 form a crank mechanism.

The impacting element 115 mainly comprises a striker 143, working as an impact part arranged in a freely sliding way inside the bore inner wall of the cylindrical shaped cylinder 141, and an impact bolt 145 that is arranged in a freely sliding way inside the cylindrical impact bolt holder 147 and that, at the same time, works as an intermediate part for transferring the kinetic energy of the striker 143 to the hammer bit 119. In the cylinder 141, an air chamber 141*a* defined by the wall surface in the radial direction of the cylinder 141 as well as the piston 129 and the striker 143 is formed. The striker 143 is driven to move linearly in the longitudinal direction of the hammer bit 119 via a pneumatic spring of the air chamber 141*a* accompanying the sliding movement of the piston 129, so that it impacts (hits) the impact bolt 145; the impact force is transferred via the impact bolt 145 to the hammer bit 119. The impact bolt holder 147 is arranged in a nearly concentric configuration ahead of the cylinder 141.

The power transmission mechanism 117 mainly comprises a power transmission gear 131 driven to rotate in the horizontal plane by the driving motor 111, a small bevel gear 133 rotating in the horizontal plane together with the power transmission gear 131, a large bevel gear 135 engaged with the aforementioned small bevel gear 133, and a power transmission sleeve 137 rotating in the vertical plane integrated with the aforementioned large bevel gear 135. The rotating force of the power transmission sleeve 137 is transferred to the chuck 104 and the hammer bit 119 held by the chuck 104. The power transmission sleeve 137 is a slender cylindrical part arranged in a concentric configuration to cover the outer peripheral side of the cylinder 141 and impact bolt holder 147; it is supported in a freely rotatable way by the gear housing 107 and barrel portion 108.

For the hammer drill 101 with the aforementioned constitution, as the trigger 109*a* is pulled by the user and power is turned on for the driving motor 111, the piston 129 is driven to perform a sliding movement linearly along the cylinder 141 via the movement transforming mechanism 113. Accompanying this movement, due to the function of the pneumatic spring inside the air chamber 141*a*, the striker 143 undergoes linear movement in the cylinder 141. As the striker 143 impacts the impact bolt 145, its kinetic energy is transferred to the hammer bit 119. On the other hand, the rotating output of the driving motor 111 is transferred via the power transmission mechanism 117 to the chuck 104. As a result, the hammer bit 119 rotates together with the chuck 104. As a result, the hammer bit 119 carries out a hammer operation in the longitudinal direction and the drill operation in the circumferential direction, so that a hole drilling operation is carried out on the workpiece (e.g., concrete).

In the following, the chuck 104 that holds the hammer bit 119 in a quick connected/disconnected way will be explained with reference to FIG. 4 through FIG. 12. Here, the chuck 104 mainly comprises a cylindrical chuck main body 151, a cylindrical tool holder 153 arranged on the inner side of the chuck main body 151 (cylindrical hole) and having a bit inserting hole 153*a* with a round cross-sectional shape and allowing insertion of the hammer bit 119 in a freely removable way, multiple rollers 157, which restrain/allow pulling-out of the hammer bit 119 inserted in the bit inserting hole 153*a*, and an operation sleeve 159, which is arranged on the outer side of the chuck main body 151 and which can release the restraining on pullout of the hammer bit 119 by the rollers 157. Here, the chuck main body 151 corresponds to the "base portion" of the present invention, and the rollers 157 correspond to the "locking part" of the present invention. Here, the rollers 157 can be substituted by steel balls (steel balls).

Figure 4:
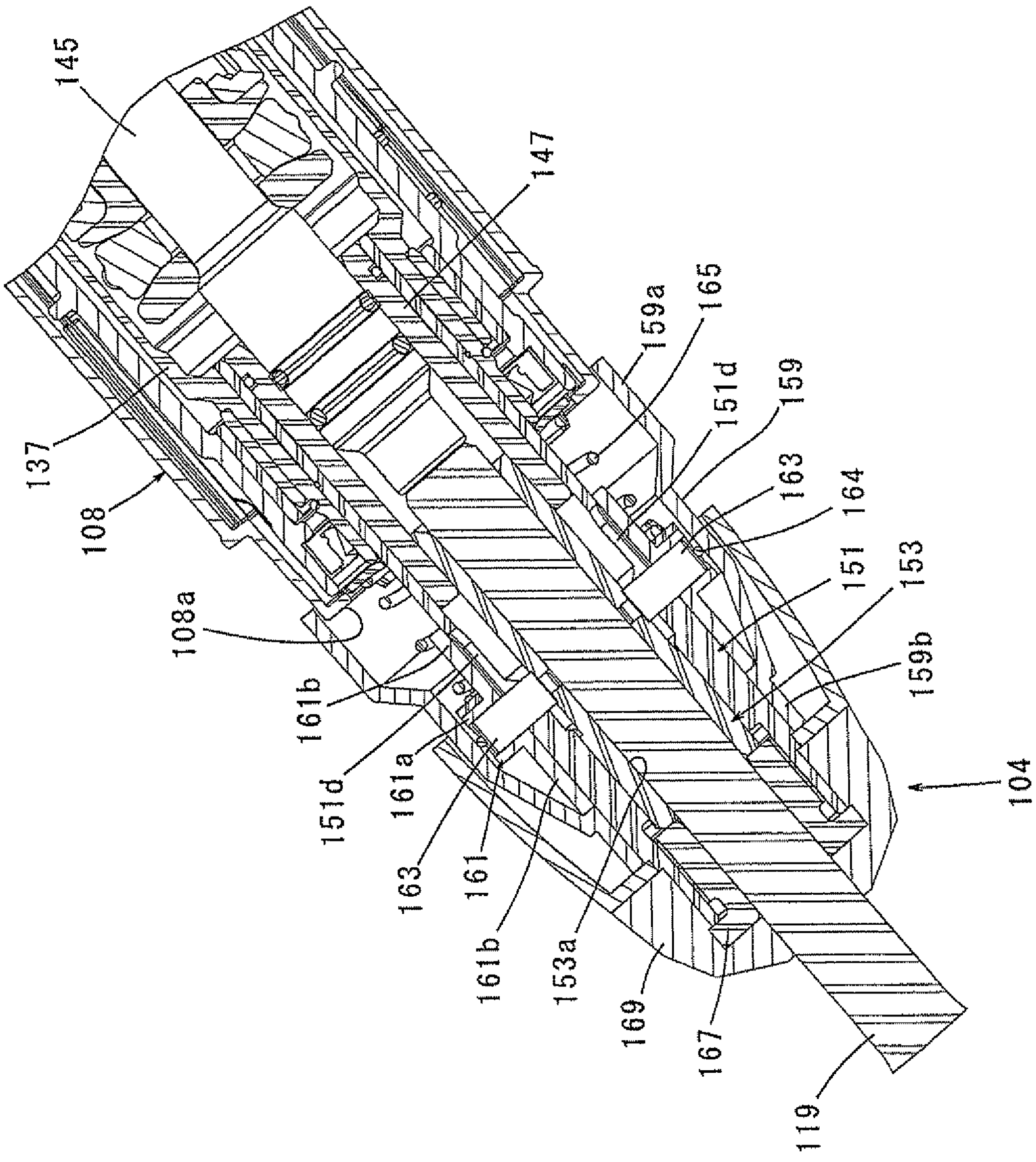
FIG. 4 is a cross-sectional view taken across B-B in FIG. 3.
Figure 5:
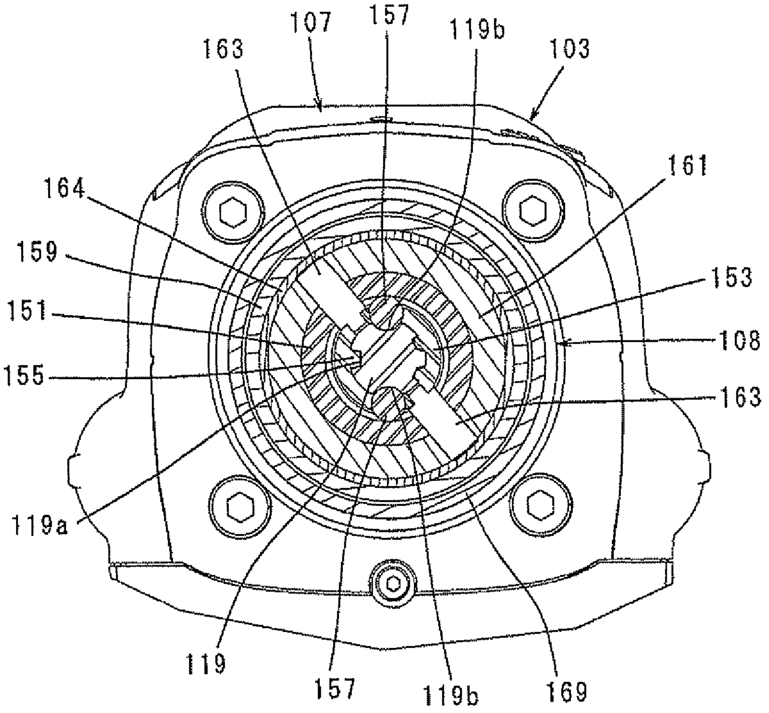
FIG. 5 is a cross-sectional view taken across C-C in FIG. 1.

As shown in FIG. 4, the chuck main body 151 is formed as a slender cylindrical part extending in the longitudinal direction of the hammer bit 119, and the rear end in the longitudinal direction is inserted into the inner periphery of the tip of the power transmission sleeve 137. On the inner side of the rear end in the longitudinal direction of the chuck main body 151, the impact bolt holder 147 in a cylindrical shape for accommodating the impact bolt 145 is arranged. Here, the chuck main body 151, the power transmission sleeve 137 and the impact bolt holder 147 are combined with each other so that they cannot move with respect to each other by multiple anchoring pins 149 that pass in the radial direction at the fitting regions where the aforementioned parts are fit with each other (see FIG. 6). As a result, when the power transmission sleeve 137 rotates, its rotating force is transferred to the chuck main body 151. The impact bolt holder 147 is formed as a part separated from the chuck main body 151. When the anchoring pins 149 has been removed, it can be removed from the power transmission sleeve 137 and the chuck main body 151. In addition, anchoring pins 149 can be stopped from pulling out by an annular part 148 that covers the outer side of the power transmission sleeve 137.

Figure 11:
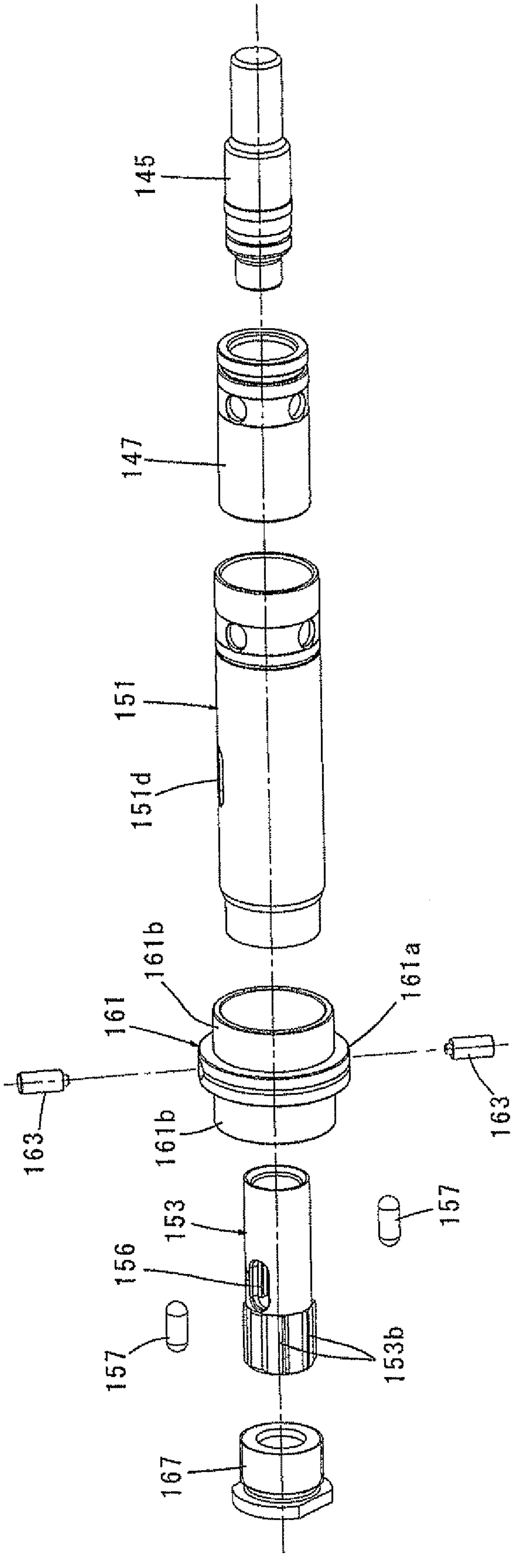
FIG. 11 is an exploded oblique view illustrating the structural parts of the chuck and its peripheral parts.
Figure 12:
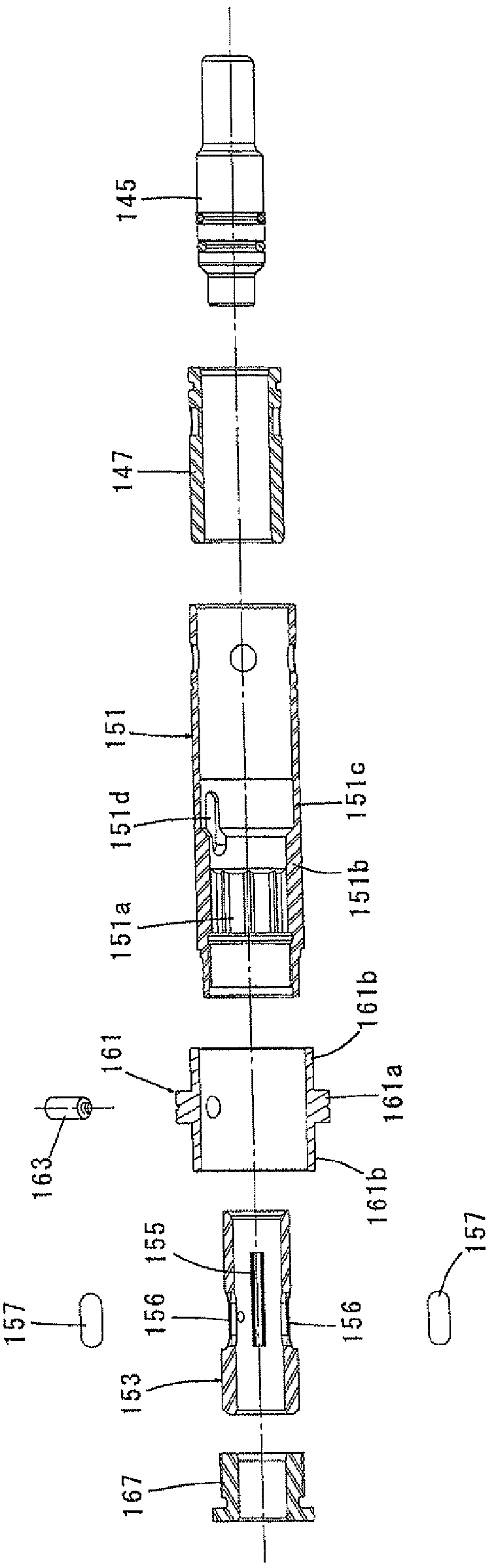
FIG. 12 is an exploded cross-sectional view illustrating the structural parts of the same chuck and its peripheral parts.

In the cylindrical hole of the chuck main body 151, a tool holder 153 made of a cylindrical part is inserted from the front end (tip) side of the chuck main body 151 and is attached, and the rear end portion in the longitudinal direction fits in the front region of the cylindrical hole of the impact bolt holder 147 in a freely sliding way. The front side region of the fit surfaces of the tool holder 153 and chuck main body 151 has a fitting structure made of spline. As a result, the tool holder 153 is attached so that, with respect to the chuck main body 151, it can undergo relative movement in the longitudinal direction of the hammer bit 119 while it cannot undergo relative movement along the circumferential direction extending in the longitudinal direction of the hammer bit 119. That is, the tool holder 153 has a constitution that ensures its rotation together with the chuck main body 151. FIG. 11 shows the spline protrusion portion 153*b* formed on the front-side outer peripheral surface in the tool holder 153. FIG. 12 shows the spline slots 151*a* formed on the front-side inner peripheral surface of the chuck main body 151.

On the inner wall of the bit inserting hole 153*a* of the tool holder 153, multiple bit driving hooks 155 extending in the longitudinal direction are formed along the circumferential direction. The bit driving hooks 155 correspond to the "hook" of the present invention. When the hammer bit 119 is inserted in the bit inserting hole 153*a*, the bit driving hooks 155 are engaged with the torque transmission slots 119*a* extending for a prescribed length in the longitudinal direction and formed on the shaft portion of the hammer bit 119 (see FIG. 5), so that rotation of the tool holder 153 can be transferred to the hammer bit 119. In addition, the torque transmission slots 119*a* are opened at the end of the shaft and they are used for positioning in the circumferential direction when the hammer bit 119 is inserted in the bit inserting hole 153*a*. The torque transmission slots 119*a* correspond to the "first slot" of the present invention.

Figure 6:
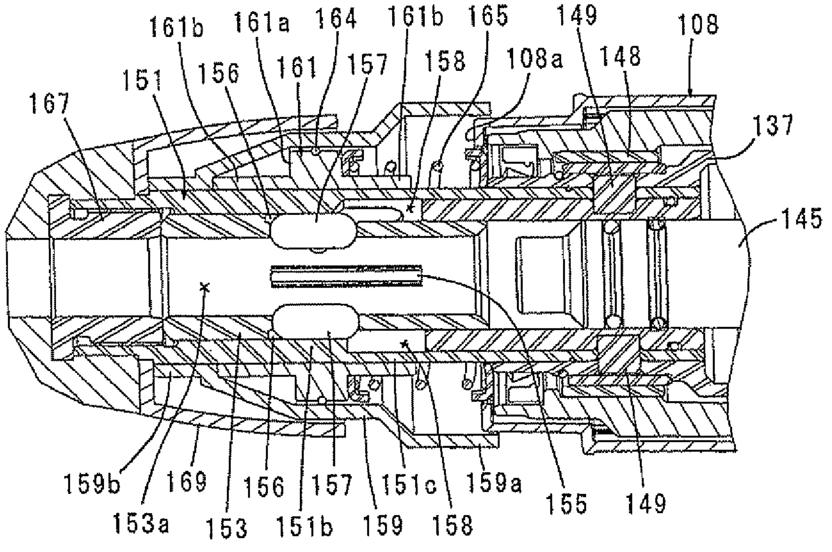
FIG. 6 is a cross-sectional view illustrating the chuck before attachment of the hammer bit.

Also, as shown in FIG. 11 and FIG. 12, at almost the middle position in the longitudinal direction of the tool holder 153, multiple roller holding holes (long holes) 156 extending for a prescribed length in the longitudinal direction while going through in the radial direction are formed with a prescribed spacing between them in the circumferential direction (in this example, two are formed with an interval of 180° in the circumferential direction). The rollers 157 are arranged in the roller holding holes 156, respectively. As shown in FIG. 6, the rollers 157 are cylindrical parts with spherical surfaces formed on the two end portions in the longitudinal direction, and they are fit in roller holding holes 156 from the outer side of the tool holder. The diameter of the roller holding holes 156 should be such that the diameter on the inner side (the side of bit inserting hole 153*a*) is smaller than the diameter on the outer side (drawing), so that falloff into the bit inserting hole 153*a* can be prevented.

The rollers 157 can move in the radial direction of the tool holder 153 in the roller holding holes 156, so that they can move in a direction perpendicular to the longitudinal direction of the hammer bit 119. That is, the rollers 157 can move between the inner position (see FIG. 6) protruding to the inner side of tool holder 153 (the side of bit inserting hole 153*a*) and the outer position (see FIG. 9) protruding to the outer side of the tool holder 153. When the rollers 157 protrude to the inner side of the tool holder 153, they are fit into the locking slots 119*b* formed on the outer periphery of the shaft portion of the hammer bit 119 inserted in the bit inserting hole 153*a*, so that pullout of the hammer bit 119 from the bit inserting hole 153*a* is restrained. On the other hand, when they protrude to the outer side of the tool holder 153, they get out (separated) from the locking slots 119*b* of the hammer bit 119, so that pullout of the hammer bit 119 from the bit inserting hole 153*a* is allowed. With regard to the rollers 157, the inner position protruding to the inner side of the tool holder 153 corresponds to the "bit holding position" of the present invention, and the outer position protruding to the outer side of the tool holder 153 corresponds to the "bit holding released position" of the present invention.

Figure 7:
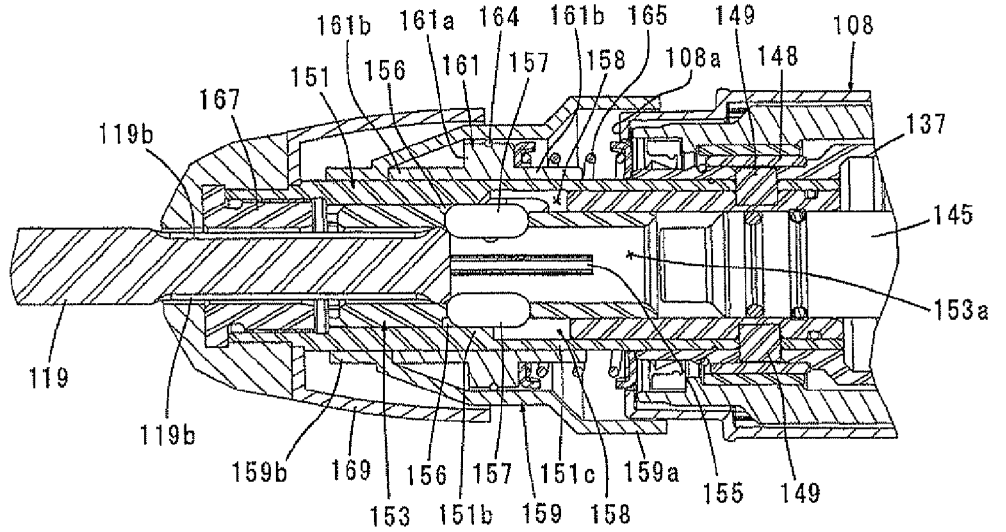
FIG. 7 is a diagram illustrating the state of attachment of the hammer bit with respect to the chuck.
Figure 8:
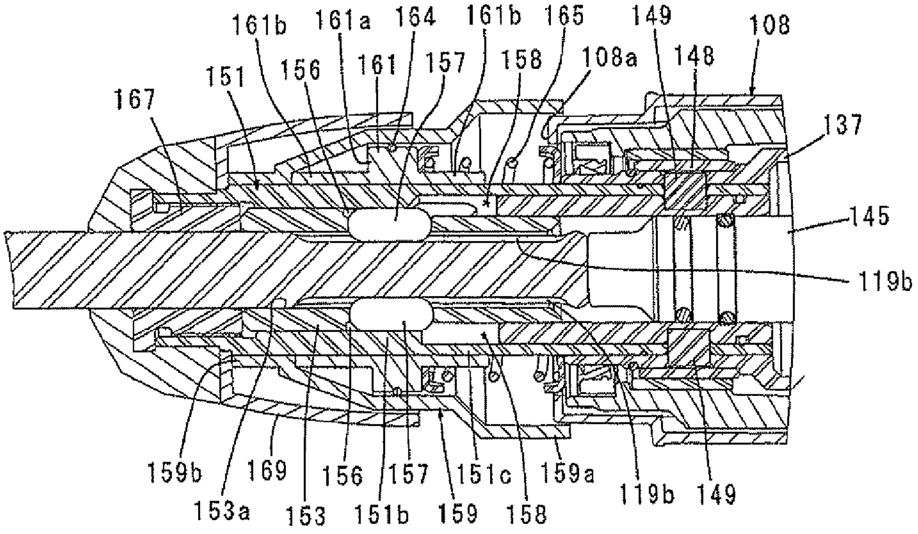
FIG. 8 is a diagram illustrating the state in which the hammer bit is attached on the chuck.

As shown in FIG. 7, the locking slots 119*b* extend in the longitudinal direction of the hammer bit 119, and, at the same time, they are formed as slots longer than rollers 157 with both the front/rear end portions closed in the aforementioned extending direction. As a result, hammer bit 119 is stopped from pullout while it can undergo relative movement in the longitudinal direction with respect to the tool holder 153. Here, the locking slots 119*b* correspond to the "second slot" of the present invention.

In addition, the rollers 157 are held such that their relative movement in directions other than the radial direction of the tool holder 153 with respect to the roller holding holes 156, that is, in the longitudinal direction and circumferential direction of the tool holder 153, are restrained. Consequently, when the tool holder 153 undergoes relative movement in the longitudinal direction of the hammer bit 119 with respect to the chuck body 151, the rollers 157 are integrated with the tool holder 153 in undergoing movement.

As shown in FIG. 6, on the inner wall of the chuck main body 151, the internal space 158 for accommodating the rollers 157 protruding to the outer side of the tool holder 153 is formed. The internal space 158 is formed as a stepped hole, with the front half portion as the smaller-diameter region 151*b* and with the rear half portion as the larger-diameter region 151*c*, for the cylindrical hole of the chuck main body 151. The internal space 158 of the chuck main body 151 corresponds to the "accommodating space" of the present invention. The front half smaller-diameter region 151*b* is the region that restrains the rollers 157 from protruding to the outer side of the tool holder 153, in other words, the region that maintains the engagement state in which the rollers 157 are engaged with the locking slots 119*b* of the hammer bit 119.

The tool holder 153 can move between the front position where the rollers 157 face the front half smaller-diameter region 151*b* of the chuck main body 151, and the rear position where the rollers 157 face the larger-diameter region 151*e*. When the tool holder 153 is driven to move to the front position, the rollers 157 contact the wall surface of the smaller-diameter region 151*b*; they protrude to the inner side of the tool holder 153 and they are engaged with the locking slots 119*b* of the hammer bit 119. On the other hand, when the tool holder 153 is driven to move to the rear position, the rollers 157, for which the restraint by the wall surface of the smaller-diameter region 151*b* is released, move to the internal space 158 and protrude to the outer side of the tool holder 153. As a result, engagement of the rollers 157 to the locking slots 119*b* of the hammer bit 119 is released, so that the hammer bit 119 can be connected/disconnected with respect to the tool holder 153. The aforementioned front position corresponds to the "bit anchored position" of the present invention, and the rear position corresponds to the "bit connection/disconnection allowed position" of the present invention.

On the outer side of the chuck main body 151, an operation sleeve 159 is arranged for moving the tool holder 153 to the rear position so as to release the engagement of the rollers 157 with respect to the locking slots 119*b* of the hammer bit 119. Here, the operation sleeve 159 corresponds to the "manual operating part" of the present invention. As shown in FIG. 4, the operation sleeve 159 has a main body portion 159*a* in a substantially conical shape expanding larger towards the rear side and a cylindrical attachment portion 159*b*, which is monolithically connected to the front side of the main body portion 159*a* and which fits to the outer periphery of the front side of the chuck main body portion 159*a* so that it can undergo relative movement in the longitudinal direction of the chuck main body 151; the rear end of the attachment portion 159*b* is arranged to cover the outer periphery of the front end of the barrel portion 108 in a freely movable fitting way.

The operation sleeve 159 and the tool holder 153 are connected with each other via the pin holder 161, connecting pin 163 and energizing spring 165 (see FIG. 4 and FIG. 5) so that when the operation sleeve 159 makes relative movement to the rear side with respect to the chuck main body 151, the tool holder 153 undergoes tracking movement to the rear position, that is, the bit connection/disconnection allowed position. The pin holder 161 is a sleeve shaped part arranged between the chuck main body 151 and the operation sleeve 159, the inner peripheral surface fits the outer peripheral surface of the chuck main body 151 so that relative movement in the longitudinal direction of the hammer bit 119 can be made, and the outer peripheral surface is covered by the main body portion 159*a* of the operation sleeve 159. Also, the pin holder 161 has an annular protrusion 161*a* that protrudes in the outer diameter direction; a number (two in this case, arranged with a phase difference of 180° in the circumferential direction) of round connecting pins 163 are inserted from the outer side of the radial direction into the annular protrusion 161*a*, chuck main body 151 and tool holder 153. On the annular protrusion 161*a* and tool holder 153, round pin holes corresponding to the connecting pins 163 are arranged. The holes 151*d* formed on the chuck main body 151 are long holes (relief holes) extending for a prescribed length in the longitudinal direction for avoiding interference with the connecting pins 163. As a result, the pin holder 161 and the tool holder 153 are connected with each other so that they can undergo relative movement with respect to the chuck main body 151.

In addition, the pullout of connecting pins 163 is stopped by the O-ring 164 fit on the outer peripheral surface of the annular protrusion 161*a*. This O-ring 164 has its outer peripheral surface in elastic contact with the inner wall of the main body portion 159*a* of the operation sleeve 159 and, due to the friction of the contact portion, the operation sleeve 159 and the pin holder 161 make contact with each other. Also, the pin holder 161 has cylindrical portions 161*b* in the front/rear portions with the annular protrusion 161*a* sandwiched between them. The front/rear cylindrical portions 161*b* is provided as a cover part tightly fit on the outer peripheral surface of the chuck main body 151 so that the long holes 151*d* of the chuck main body 151 are blocked from the outer side. As the pin holder 161 moves in the longitudinal direction, the blocked state of the long holes 151*d* can always be maintained. Here, the long holes 151*d* correspond to the "opening portion" of the present invention, and the cylindrical portions 161*b* in front/rear of the pin holder 161 correspond to the "dustproof cover part" of the present invention.

The front end portion of the barrel portion 108 extends to the inner side in the radial direction of the chuck main body 151 and, at the same time, the extending end portion has an annular flange portion 108*a* which contacts the outer surface of the chuck main body 151. An energizing spring 165 is arranged intermediately between the flange portion 108*a* and the annular protrusion 161*a* of the pin holder 161. Here, the energizing spring 165 is arranged in the space between the inner peripheral surface of the main body portion 159*a* of the operation sleeve 159 and the cylindrical portion 161*b* on the rear side of the pin holder 161 as well as the outer peripheral surface of the chuck main body 151; it energizes the pin holder 161 forward. For the pin holder 161 that is forward-energized, the end surface of the cylindrical portion 161*b* on the front side contacts the step portion as the boundary between the main body portion 159*a* and attachment portion 159*b* of the operation sleeve 159. As a result, the operation sleeve 159 and the tool holder 153 are always located in the front position. That is, the energizing spring 165 is arranged as a part for energizing the tool holder 153 so that it is driven to move monolithically to the front position (bit anchoring position) where the rollers 157 face the smaller-diameter region 151*b* of the chuck main body 151. The energizing spring 165 corresponds to the "energizing part" of the present invention.

As shown in FIG. 4, a female thread is formed on the inner surface of the tip (front end portion) of the cylindrical hole of the chuck main body 151; a tip sleeve 167 with a male thread formed on its outer surface is attached on the female thread in a freely removable way. The tool holder 153 is inserted from the tip into the cylindrical hole of the chuck main body 151, then it is stopped from pullout as the front end of the tool holder 153 contacts the rear end of the tip sleeve 167 attached on the chuck main body 151 after insertion. Consequently, after the tip sleeve 167 is removed from the chuck main body 151, the tool holder 153 can be removed from the chuck main body 151. In addition, as explained above, the tool holder 153 inserted in the cylindrical hole of the chuck main body 151 can undergo relative movement in the longitudinal direction of the hammer bit 119 as it is integrated with the aforementioned rollers 157.

On the tip sleeve 167, a tip dustproof cover 169 is monolithically arranged. The tip dustproof cover 169 is formed in a conical shape that expands towards the rear side, and it is arranged to cover from the outer side the front side region in the tip area of the chuck main body 151 and the outer surface of the operation sleeve 159. At the same time, it is in close contact with the outer peripheral surface of the shaft portion of the hammer bit 119 inserted into the bit inserting hole 153*a* of the tool holder 153, so that the invasion of dust from the pit surface can be prevented.

The chuck 104 related to the embodiment has the aforementioned constitution. In the following, the operation and application method of the chuck 104 will be explained.

When the hammer bit 119 is not inserted into the bit inserting hole 153*a* of the tool holder 153, under the energizing force of the energizing spring 165, the tool holder 153 and the rollers 157 are held in the front position as the initial position. As shown in FIG. 6, at the front position, the rollers 157 are pressed from the outer side by the smaller-diameter region 151*b* of the chuck main body 151, and they protrude into the inserting holes 153*a*.

In this state, the torque transmission slots 119*a* of the hammer bit 119 are positioned with respect to the bit driving hooks 155 of the tool holder 153; at the same time, as the shaft portion of the hammer bit 119 is inserted in the bit inserting hole 153*a*, as shown in FIG. 7, the shaft end surface (the right hand side in FIG. 7) of the hammer bit 119 contacts the internal diameter side of the end portion spherical surface of the roller 157 and it pushes the roller to the rear side. As a result, the rollers 157 and tool holder 153 are driven to move to the rear side. In this case, because the pin holder 161 connected with the tool holder 153 by the connecting pins 163 moves together with the tool holder 153, movement of the tool holder 153 to the rear side is carried out against the energizing force of the energizing spring 165. Then, as the rollers 157 that have moved to the rear side become facing the larger-diameter region 151*c* that forms the internal space 158 of the chuck main body 151, the rollers 157 which is pressed in internal diameter side of the end portion spherical surface move into the internal space 158 by the partial force acting in the radial direction, then they are pulled in the inserting holes 153*a* so that further insertion of the hammer bit 119 is allowed.

Then, as the hammer bit 119 is further inserted, rollers 157 start to face the locking slots 119*b* of the hammer bit 119, so that under the energizing force of the energizing spring 165, the rollers 157 and the tool holder 153 are driven to move forward, and, during the process of movement, the front-side end portion spherical surface of the rollers 157 is pressed by the smaller-diameter region 151*b* of the chuck main body 151 so that it moves to the inner side in the radial direction. As a result, the rollers 175 fit in the locking slots 119*b* of the hammer bit 119. As a result, the rollers 157 and the tool holder 153 are returned to the front position as the initial position, and the hammer bit 119 is installed while its pullout is stopped by the rollers 157 (see FIG. 8). As a result, it becomes possible to carry out the hole drilling operation by the hammer drill 101.

Figure 9:
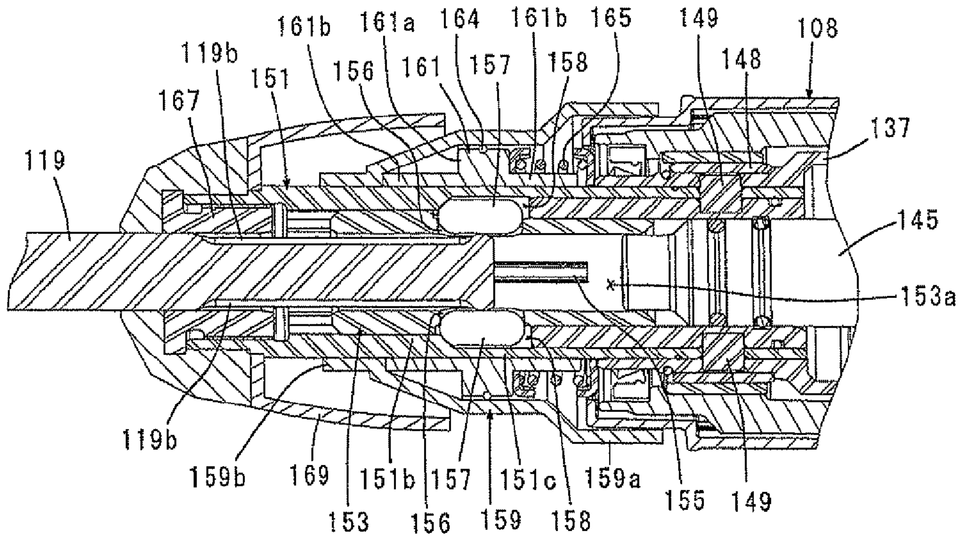
FIG. 9 is a diagram illustrating the state in which the hammer bit is removed from the chuck.
Figure 10:
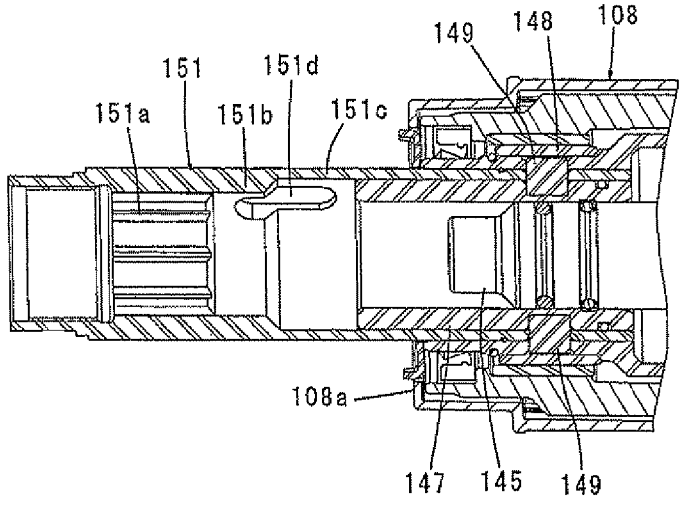
FIG. 10 is a diagram illustrating the state in which the tip sleeve, roller and tool holder are removed from the chuck main body.

When the hammer bit 119 is taken out, as shown in FIG. 9, as the operation sleeve 159 is held to move backward, the pin holder 161 pressed by the operation sleeve 159 moves backward against the energizing force of the energizing spring 165. At the same time, the tool holder 153 and rollers 157 connected by the pin holder 161 and connecting pins 163 are driven to move backward, so that the rollers 157 face the larger-diameter region 151*c* that forms the internal space 158 of the chuck main body 151, and movement into the internal space 158 is allowed. In this state, as the hammer bit 119 is driven to move forward, the rollers 157, which was pressed in the internal diameter side of the rear-side end portion spherical surface by the rear side portion of the locking slots 119*b* of the hammer bit 119, are driven to move to the internal space 158, and they disengage from the locking slots 119*b*. Consequently, the hammer bit 119 can be pulled out from the bit inserting hole 153*a* of the tool holder 153.

In this embodiment, the rollers 157 have a constitution in which they can move between the inner position protruding to the inner side of the tool holder 153 and the outer position protruding to the outer side of the tool holder 153, and the rollers 157 and the tool holder 153 have a constitution that allows movement between the front position, where the rollers 157 are kept at the inner position so that pullout of the hammer bit 119 is restrained, and the rear position where the rollers 157 can be driven to move to the outer position and the restraint on pullout of the hammer bit 119 is released. As a result, attachment and removal of the hammer bit 119 with respect to the tool holder 153 can be carried out easily.

According to this embodiment, the rollers 157 and the tool holder 153 have their outer side covered by the chuck main body 151. As a result, invasion of dust from the other side of the tool holder 153 into it can be suppressed, and the dust-proof effect can be improved.

In addition, according to this embodiment, the tool holder 153 arranged on the inner side of the chuck main body 151 and the operation sleeve 159 arranged on the outer side of the chuck main body 151 are connected with each other by connecting pins 163 passing through the chuck main body 151. For this purpose, long holes 151*d* are arranged on the chuck main body 151 to avoid interference with the connecting pins 163. In this embodiment, front/rear cylindrical portions 161*b* extending for a prescribed length in the longitudinal direction is arranged on the pin holder 161 that holds the connecting pins 163 and, by means of the front/rear cylindrical portions 161*b*, the long holes 151*d* are blocked. Consequently, it is possible to reliably prevent the dust from invading into the chuck main body 151 through the long holes 151*d*.

In addition, according to this embodiment, the tool holder 153 is formed as a part separated from the impact bolt holder 147 that accommodates the impact bolt 145. Consequently, the tool holder 153 can be minimized to the smallest necessary size for holding the shaft portion of the hammer bit 119. Consequently, it is possible to carry out exchange of the tool holder 153 when the hooks are worn off, and it is possible to reduce the burden of cost on the user. In addition, as tool holder 153 is formed smaller in size, it is possible to cut the cost when the tool holder 153 is made of a wear-resistant material or the tool holder 153 is treated to improve the wear resistance.

According to the present embodiment, the energizing spring 165 for energizing the tool holder 153 and rollers 157 forward has a constitution in which the operation sleeve 159 is energized via the pin holder 161. Consequently, it is possible to arrange the energizing spring 165 on the outer side of the chuck main body 151, and compared with the constitution where the tool holder 153 is directly energized, it is easier to guarantee the space for arranging the tool holder 153 and it is easier to carry out the assembling operation.

In addition, according to this embodiment, while the impact bolt holder 147 is formed as a part separated from the chuck main body 151, it is attached such that it can be removed with respect to the chuck main body 151. Consequently, when the impact bolt holder 147 is worn off, it is possible to exchange the impact bolt holder unit for a new one. As a result, it is possible to carry out exchange at a lower cost and it is possible to cut the burden of cost on the user.

In addition, according to this embodiment, the tool holder 153 is fit in the cylindrical hole of the chuck main body 151 in a freely sliding way, and the constitution restrains it from pullout by means of the tip sleeve 167 screwed (thread fit) in the tip of the cylindrical hole of the chuck main body 151. Consequently, when the tip sleeve 167 is to be removed from the chuck main body 151, the tool holder 153 can simply be removed from the chuck main body 151. Also, the tip sleeve 167 is in close contact with the shaft portion of the hammer bit 119 inserted in the bit inserting hole 153*a*, so that it is possible to suppress the invasion of dust through the gap with the shaft portion to the interior.

In the above, an explanation has been made on the impacting tool with reference to an electric hammer drill 101 as an example. However, the present invention is not limited to the aforementioned hammer drill 101. It may also be adopted in any electric hammer that has the hammer bit 119 perform only the impact movement in the longitudinal direction.

DESCRIPTION OF REFERENCE NUMERALS AND SIGNS

101 hammer drill (impact tool)
103 main body
104 chuck
105 motor housing
107 gear housing
108 barrel portion
108*a* annular flange portion
109 handgrip
109*a* trigger
111 driving motor
113 movement transforming mechanism
115 impacting element
117 power transmission mechanism
119 hammer bit (tool bit)
119*a* torque transmission slot (first slot)
119*b* locking slot (second slot)
121 driving gear
123 slave gear
125 crankshaft
127 connecting rod
129 piston
131 power transmission gear
133 small bevel gear
135 large bevel gear
137 power transmission sleeve
141 cylinder
141*a* air chamber
143 striker
145 impact bolt
147 impact bolt holder
148 annular part
149 anchoring pin
151 chuck main body
151*a* spline slot
151*b* smaller-diameter region
151*c* larger-diameter region
151*d* long hole (opening portion)
153 tool holder
153*a* bit inserting hole
153*b* spline protrusion portion
155 bit driving hook (hook)
156 roller holding hole
157 roller (locking part)
158 internal space (accommodating space)
159 operation sleeve
159*a* main body portion
159*b* attachment portion
161 pin holder
161*a* annular protrusion portion
161*b* cylindrical portion (dustproof cover)
163 connecting pin
164 O-ring
165 energizing spring (energizing part)
167 tip sleeve
169 tip dustproof cover

The invention claimed is:

1. An impacting tool having a tool bit configured to carry out an operation with linear movement in a longitudinal direction to perform the prescribed processing operation on the workpiece, comprising;

a tool holder having a bit inserting hole that allows the tool bit to be inserted in the bit inserting hole, the tool holder having a hole on an inner surface of the tool holder, and a locking part that holds the tool bit inserted into the bit inserting hole so that the tool bit cannot be pulled out from the bit inserting hole, a longitudinal length of the hole substantially corresponding to a longitudinal length of locking part so that, when the locking part is disposed in the hole of the tool holder the locking part is restricted to move within the hole in the longitudinal direction of the tool bit and the locking part is movable in a direction perpendicular to the longitudinal direction of the tool bit;

wherein the locking part undergoes relative movement with respect to the tool holder in the direction perpendicular to the longitudinal direction of the tool bit to allow to move between a bit holding position where the locking part is engaged with the tool bit inserted in the bit inserting hole to restrain pulling of the tool bit from the bit inserting hole, and a bit holding released position where the lock is released and the tool bit can be pulled out from the bit inserting hole, the locking part not being able to move in the direction perpendicular to the longitudinal direction of the tool bit in the bit holding position, and the locking part being able to move in the direction perpendicular to the longitudinal direction of the tool bit in the bit holding released position;

wherein the locking part and the tool holder move together in the longitudinal direction of the tool bit while the locking part is disposed in the hole of the tool holder, the locking part and the tool holder moving together in the longitudinal direction of the tool bit between a bit anchored position where the locking part is set at the bit holding position to maintain the locked state with respect to the tool bit and a bit connection and disconnection allowed position where the locking part is set at the bit holding released position so that the lock can be released with respect to the tool bit.

2. The impacting tool according to claim 1, further comprising, an impact bolt for applying the impact force in the longitudinal direction on the tool bit, and an impact bolt holder that accommodates the impact bolt so that the impact bolt can undergo linear movement;

wherein the tool holder is formed as a part separated from the impact bolt holder, and the tool holder can undergo relative movement in the longitudinal direction with respect to the impact bolt holder; and on the tool holder, a hook for transferring the rotating force of the tool holder to the tool bit is formed and, on the tool bit, a first slot where the hook is engaged and a second slot where the locking part is engaged are formed, respectively.

3. The impacting tool according to claim 2, wherein the impact bolt holder is formed as a part separated from the base portion, and the impact bolt holder is attached on the base portion so that the impact bolt holder can be removed from the base portion.

4. The impacting tool according to claim 3, wherein on the tip of the base portion, a tip sleeve is removably attached in contact with the outer peripheral surface of the tool bit.

5. The impacting tool according to claim 4, wherein the tool holder is inserted from the tip side of the base portion into the base portion and, after the insertion, the tool holder is locked by the tip sleeve attached on the base portion; when the tip sleeve is removed from the base portion, the tool holder can be pulled out from the base portion.

6. The impacting tool according to claim 1, comprising, a base portion covering the outer peripheral side of the tool holder, wherein an accommodating space for accommodating the locking part is formed on the inner wall of the base portion; and wherein when the tool holder and the locking part are located at the bit connection and disconnection allowed position, the accommodating space allows accommodation of the locking part and moving of the locking part to the bit holding released position.

7. The impacting tool according to claim 1, wherein when the tool bit is inserted into the bit inserting hole of the tool holder and the locking part is pressed by the tool bit, the locking part and the tool holder are integrated with each other while moving in the longitudinal direction of the tool bit from the bit anchored position to the bit connection and disconnection allowed position and, after the locking part is driven to move to the bit connection and disconnection allowed position, as the tool bit is further inserted into the bit inserting hole, the locking part is pressed by the tool bit so that the locking part is driven to move to the bit holding released position; after movement to the bit holding released position, as the tool bit is further inserted into the bit inserting hole, the locking part is driven to move from the bit holding released position to the bit holding position, so that the tool bit is locked to the locking part or becomes the lockable state; in this lockable state, as the tool holder and the locking part are driven to move from the bit connection and disconnection allowed position to the bit anchored position, the locking part is locked to the tool bit and the tool bit is held on the tool holder.

8. The impacting tool according to claim 1 comprising, a manual operating part that can be operated to move the tool holder and the locking part together in the longitudinal direction of the tool bit; wherein when the manual operating part is operated to move the tool holder and the locking part together in the longitudinal direction of the tool bit from the bit anchored position to the bit connection and disconnection allowed position, it is possible to remove the tool bit from the tool holder.

9. The impacting tool according to claim 8, comprising, an energizing part that energizes the tool holder and the locking part so that the tool holder and the locking part are driven to move from the bit connection and disconnection allowed position to the bit anchored position while they are integrated with each other;

wherein the energizing part is arranged so that the manual operating part is energized.

10. The impacting tool according to claim 8, comprising, a base portion that covers the outer peripheral side of the tool holder;

wherein a through opening portion perpendicular to the longitudinal direction of the tool bit is formed on the base portion;

the manual operating part is arranged on the outer side of the base portion and is connected with the tool holder through the opening portion; and the manual operating part has a dustproof cover that blocks the opening portion and is in contact with the outer surface of the base portion in a relatively slidable way.

11. The impacting tool according to claim 1 further comprising a manual operating part that is configured to be movable in the longitudinal direction of the tool bit by an operation of a user, wherein the manual operating part is disposed outer side of the tool holder in the direction perpendicular to the longitudinal direction of the tool bit, and the manual operating part is connected to the tool holder such that longitudinal movement of the manual operation part moves the tool holder in the longitudinal direction of the tool bit.

12. The impacting tool according to claim 1 further comprising a base portion having a cylindrical shape, wherein the tool holder is inserted into a cylindrical hole of the base portion such that the tool holder is movable along the cylindrical hole of the base portion in the longitudinal direction of the tool bit.

* * * * *